L. S. Robbins
Preserving Skins of Animals.
№ 75794      Patented Mar. 24, 1868.
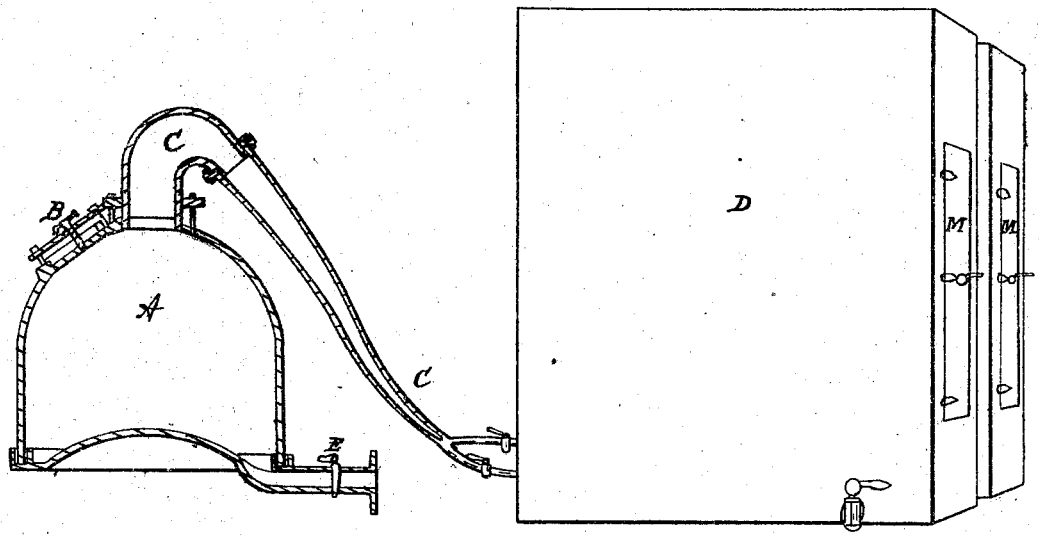
Witnesses.
S. H. Linny
R. Bureau
Inventor.
Louis S. Robbins

UNITED STATES PATENT OFFICE.

LOUIS S. ROBBINS, OF NEW YORK, N. Y.

IMPROVEMENT IN PRESERVING SKINS OF ANIMALS.

Specification forming part of Letters Patent No. 75,794, dated March 24, 1868.

*To all whom it may concern:*

Be it known that I, LOUIS S. ROBBINS, of the city, county, and State of New York, have invented a new and Improved Process for Preserving the Skins of Animals from Decomposition, and for preventing the destruction of the same by worms or insects; and I do hereby declare that the following is a full, clear, and exact description thereof, which will enable those skilled in the art to make use of the same, special reference being had to the accompanying drawings, forming part of this specification.

It is a well-known fact that the skins of animals, when exposed to the atmosphere at warm temperatures, are rapidly destroyed by decomposition or otherwise by worms and insects. To prevent this destruction is therefore the object of this invention, and the intended object is thereby accomplished.

The method consists in saturating the skins with the vapors of such preservative materials as will effectually prevent or antisept their decomposition, which naturally occurs in a warm atmosphere, at the same time they are secured against the attacks of worms and insects.

The various means heretofore employed for preserving the skins of animals have been only partially successful, owing chiefly to the imperfect adaptation of the materials used and the defective methods of their application. A representation of one form of apparatus for the use or application of my new and improved process will be found in the plate annexed to and forming part of this specification.

A in the drawings represents a retort, made of any desired form and size, in which oil distilled from coal-tar, wood-tar, bitumen, and other similar substances is placed and subjected to the action of heat from any suitable furnace.

B indicates the man-hole in the upper part of the retort, used in cleansing the same and in changing its contents.

C C exhibit the pipe communicating with retort A at or near its top, passing to and communicating with chambers or receptacles D.

E represents the discharge pipe, through which the remaining contents are drawn off after the process is over.

Heat being applied to retort A, containing the materials before named and described, the temperature is raised to above 187° Fahrenheit. The heat is continued until the chamber H is filled with the vapors, which largely consist of carbolic acid, the process being continued until the skins in chamber D are sufficiently saturated so that they will resist the influence of the atmosphere and the attacks of worms and insects. The vapors condensing on the sides of the chamber may be drawn off through pipe H, which may be placed in or near the bottom.

The hides or skins must be so arranged in the chamber as to permit the vapor to come into complete contact with the entire surfaces of each, and this is accomplished by so disposing of them that there will be slight spaces between them.

As carbolic acid is the most powerful and permanent of all the antiseptics known, and its presence being a sure protection against the ravages of insects, it will appear, in view of the foregoing description, that by my process I am enabled to preserve the skins of animals in a more perfect and economical manner than the same can be done by the use of any other method or process in which either solid or liquid materials are employed.

I do not intend to limit myself to any specific form of apparatus, as several different forms of apparatus may be devised and constructed for this purpose, and by which the operation may be effectually performed; but What I do claim, and desire to secure by Letters Patent, is—

The process herein described for preserving the skins of animals from the destructive influence of the atmosphere and the attacks of every species of insects, the same consisting in saturating the skins with vapors of carbolic acid obtained from the oil of coal-tar, wood-tar, bitumen, or other similar substances, substantially as herein described.

LOUIS S. ROBBINS.

Witnesses:
G. B. BRITTAN,
MARSHALL ROBBINS.